Figure 1:
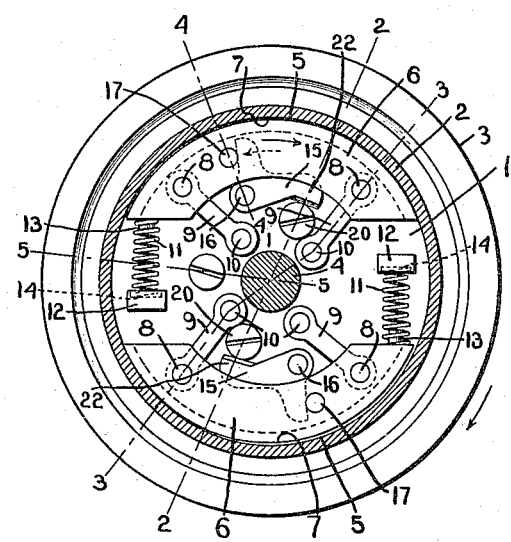

C. F. PINKHAM.
CLUTCH.
APPLICATION FILED AUG. 5, 1915.

1,160,529.

Patented Nov. 16, 1915.

Inventor.
Charles F. Pinkham,
by Heard Smith & Tennant.
Atty's.

UNITED STATES PATENT OFFICE.

CHARLES F. PINKHAM, OF BOSTON, MASSACHUSETTS.

CLUTCH.

1,160,529.  Specification of Letters Patent.  Patented Nov. 16, 1915.

Application filed August 5, 1915. Serial No. 43,860.

*To all whom it may concern:*

Be it known that I, CHARLES F. PINKHAM, a citizen of the United States, residing at Boston, county of Suffolk, State of Massachusetts, have invented an Improvement in Clutches, of which the following description, in connection with the accompanying drawing, is a specification, like characters on the drawing representing like parts.

This invention relates to friction clutches and has for one of its objects to provide a novel friction clutch which is so constructed that it will be operative to connect the two clutch members only when the driving clutch member is rotating in a forward direction, and which will be inoperative automatically to effect a clutching engagement when the driving member is rotating in a reverse direction.

Another object is to provide a novel friction clutch in which the clutching elements of one clutch member are positively disengaged from the other clutch member when the clutch is to be released. One advantage of this is that it enables the driven member of the clutch to be brought to rest always at a predetermined point in a cycle of operations.

Other objects of the invention are to improve friction clutches, all as will be more fully hereinafter set forth.

In order to give an understanding of my invention I have illustrated in the drawings a selected embodiment thereof which will now be described, after which the novel features will be pointed out in the appended claims.

Figure 2:
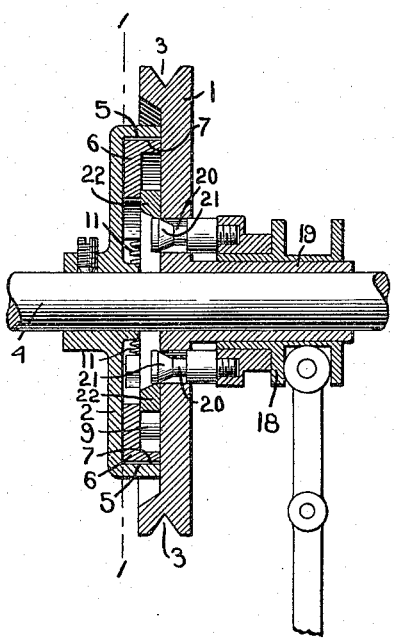
Figure 3:
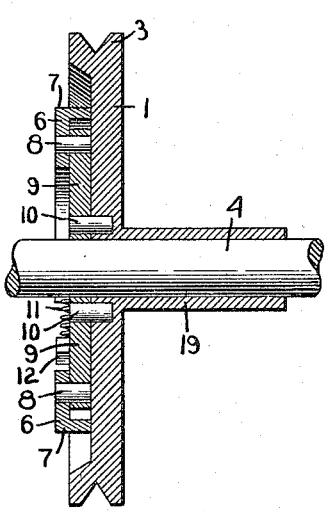
Figure 4:
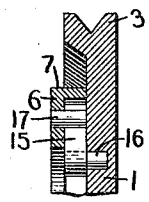
Figure 5:
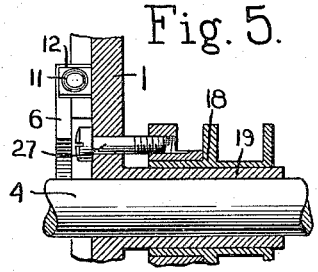

In the drawings, Figure 1 is a sectional view through a clutch embodying my invention taken on the line 1—1, Fig. 2; Fig. 2 is a sectional view on the line 2—2, Fig. 1; Fig. 3 is a section on the line 3—3, Fig. 1; Fig. 4 is a section on the line 4—4, Fig. 1; Fig. 5 is a fragmentary section on the line 5—5, Fig. 1.

In the drawings 1 indicates the driving member of the clutch and 2 the driven member thereof. The driving member is herein shown as connected to or forming part of a driving pulley 3 and the driven member 2 is herein illustrated as secured to the shaft 4 from which the machine with which the clutch is operated is driven. This particular arrangement, however, is not essential to the invention, as the driving member might be operated from a shaft, as well as from a pulley without departing from the invention. The driven clutch member 2 is shown as provided with a concentric friction clutch surface 5, and the driving clutch member 1 is provided with a plurality of clutch elements 6, each having a friction clutch surface 7 adapted to engage the friction clutch surface 5 of the driven clutch member 2. These clutch elements 6 are herein shown as segmental blocks, the outer faces of which constitute the clutch surfaces 7. Said clutch surfaces have a concentric relation to the clutch members. One or more of these clutch elements may be employed. I have shown in the drawings two of them. They are each secured to the driving clutch member 1 so as to move bodily in an eccentric path thereby providing for moving the clutch faces 7 toward and from the clutch surface 5. The means by which these clutch elements 6 are secured to the clutch member 1 to have this bodily movement is such that when the driving member 1 is rotating in a forward direction, the expansive movement of the clutch elements 6 will effect the clutching engagement between the clutch members, while when the driving clutch member 1 is rotating in a reverse direction such expansive movement of the clutch element 6 will fail to effect a clutching engagement between the clutch members. Each clutch element 6 is pivotally connected at 8 to a pair of links 9, said links being in turn pivoted to the driving clutch element 1 at 10. These links 9 stand at an angle to a radial line, as seen in Fig. 1, and as a result, when the clutch elements 6 are swung about the links 9 in the directions of the arrows, they will be forced outwardly or expanded. This is the movement which is given to the clutch elements when the clutch is to be engaged. A movement of the clutch elements in the opposite direction will withdraw them from frictional contact with the friction clutch surface 5 of the driven member and will thus disengage the clutch.

Automatically-operative means are provided which tend to throw the clutch elements 6 into clutch-engaging position and positive means are provided for moving said elements in the opposite direction to disengage the clutch. The automatically-operative means herein shown is in the form of a push-spring 11 for each clutch member, each spring resting at one end against a lug 12 rigid with the clutch member 4 and at the other end engaging the end of the clutch element 6, said element having a guiding projection 13 which holds the spring in place. The lug 12 may be provided with a spring-receiving recess 14 to assist in retaining the spring in proper position. The action of the springs 11 will tend to move the clutch elements into their clutching position in engagement with the clutch surface 5.

For positively disengaging the clutch elements 6 from the clutch surface 5, I have herein provided elbow levers 15 pivoted at 16 to the driving clutch member 1 and engaging projections 17 extending from the inner faces of the clutch elements 6. Swinging movement of the elbow levers 15 in the direction of the arrows, Fig. 1, will operate to move the clutch elements 6 positively against the action of the springs 11 into their clutch-disengaging position. This positive movement is given to the elbow levers 15 from a clutch-actuating collar 18 that is slidably mounted on a hub 19 formed on the driving clutch member 1. This collar has clutch-actuating projections 20 extending therefrom and through the clutch member 1, the ends of the projections being beveled or tapered, as at 21, and engaging the arms 22 of the elbow levers 15. When the clutch-actuating collar 18 is moved longitudinally of the hub 19 in a direction away from the driving clutch member 1, the corresponding movement of the tapered ends 21 of the clutch-actuating projections 20 operates against the arms 22 of the elbow levers 15 to turn the latter, thus positively moving the clutch elements 6 against the action of the springs 11 and in a direction to disengage the clutch. When the collar 18 is moved in the opposite direction toward the member 1, the elbow levers 15 are released by the tapered ends 21 of the clutch-actuating pins, and the springs 11 then automatically come into play to throw the clutch elements 6 into clutch-engaging position.

I have herein shown the projections 20 as adjustable as to their length, so as to provide for adjusting the position of the tapered portions 21 thereof relative to the collar 18. This is herein accomplished by making said projection in the form of screws that are screwed into the collar 18. By turning up or backing off the screws the effective length of the projections 20 can be readily adjusted.

It will be noted that the clutch-disengaging movement of the clutch elements is a positive one, while the clutch-engaging movement is automatically effected by means of the springs 11. The driving clutch element 1 normally rotates in the direction of the arrow when it is driving the machine, this being its forward direction of rotation. It will be noted that when the clutch is in engagement, this direction of rotation is such that the resistance which the clutch offers tends to cause the clutch surfaces to be more firmly drawn into clutching engagement. On the other hand, if the driving member 1 should be rotated in the reverse direction the frictional engagement between the clutch surfaces would tend to throw the clutch elements 6 out of clutching engagement and would thus allow the clutch to slip. The clutch, therefore, has such a construction that even when the clutching elements are thrown into clutching engagement, said clutch will not be effective to drive the shaft in case the driving element is rotated in a reverse direction, but is only effective when the driving element is being rotated forwardly. By means of the positively-acting clutch-disengaging mechanism herein shown the clutch surfaces will be released when the collar 18 is at a predetermined point in its movement. This is important as it provides means whereby the clutch may be always disengaged positively at a predetermined point in the cycle of operations of the machine with which it is being driven by the clutch.

27 is a stop screw screwed into the collar 18 and operating through the driving member 1. The purpose of this screw is to limit the sliding movement of the collar 18 away from the member 1.

While I have illustrated a selected embodiment of my invention, I do not wish to be limited to the constructional features shown.

I claim:

1. In a clutch, the combination with two clutch members, one of which has an annular clutch surface, of a clutch element having a clutch surface to coöperate with said annular surface, links connecting the clutch element to the other clutch member to permit said element to swing toward and from the clutch surface, a spring tending normally to move said clutch element into clutch-engaging position, and means to withdraw said element positively.

2. In a clutch, the combination with two clutch members, one of which has an annular clutch surface, of a clutch element having a clutch surface to coöperate with the annular surface, links pivotally connecting said clutch element to the other clutch member, said links being situated at an angle to a radial line whereby swinging movement of said clutch element on said links will cause it to move into and out of clutching engagement with the annular clutch surface, a spring tending to move said clutch element into clutching engagement, and means to move said clutch element positively in a direction to release the clutch.

3. In a clutch, the combination with two clutch members, one of which has an annular clutch surface, of a clutch element having a clutch surface to coöperate with the annular surface, links pivotally connecting said clutch element to the other clutch member, said links being situated at an angle to a radial line whereby swinging movement of said clutch element on said links will cause it to move into and out of clutching engagement with the annular clutch surface, a spring tending to move said clutch element into clutching engagement, a lever pivoted to said other clutch member and engaging said clutch element, and means to actuate said lever to swing the clutch element into inoperative position against the action of the spring.

4. In a clutch, the combination with two clutch members, one of which has an annular clutch surface, of a clutch element having a clutch surface to coöperate with the annular surface, links pivotally connecting said clutch element to the other clutch member, said links being situated at an angle to a radial line whereby swinging movement of said clutch element on said links will cause it to move into and out of clutching engagement with the annular clutch surface, a spring tending to move said clutch element into clutching engagement, a lever pivoted to said other clutch member and engaging said clutch element, a slidable clutch-actuating collar, and connections between said collar and lever for actuating the latter.

5. In a clutch, the combination with two clutch members, one of which is an annular clutch surface, of a clutch element to engage said clutch surface, links connecting the clutch element to the other clutch member, said links being situated at an angle to radial lines whereby swinging movement of the clutch element about said links will throw said element into and out of clutching engagement with said clutch surface, a spring acting against the clutch element to move it into clutch-engaging position, a lever pivoted to said other clutch member and engaging said clutch element, a clutch-actuating collar movable axially of said clutch members, and a projection extending from said collar, said projection having a tapered head to engage said lever whereby movement of the lever in one direction will positively disengage said clutch.

In testimony whereof, I have signed my name to this specification.

CHARLES F. PINKHAM.

Copies of this patent may be obtained for five cents each, by addressing the "Commissioner of Patents, Washington, D. C."